Aug. 8, 1967   R. J. BLACKWELL ET AL   3,334,688
MISCIBLE DISPLACEMENT PROCESS USING MODIFIED ALCOHOL BANKS
Filed April 13, 1964   6 Sheets-Sheet 1
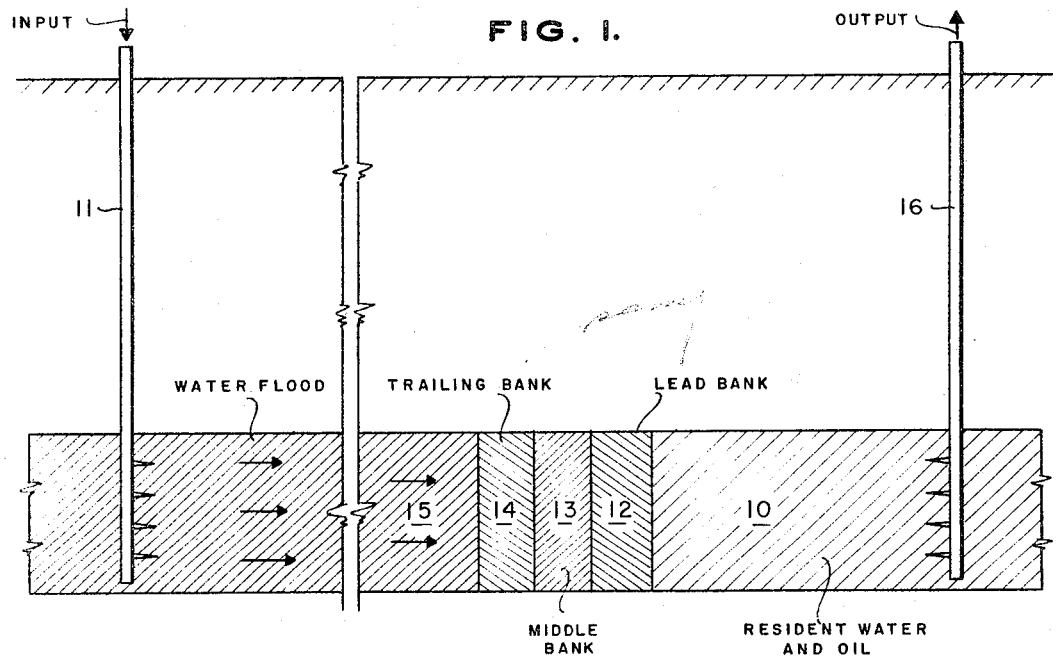
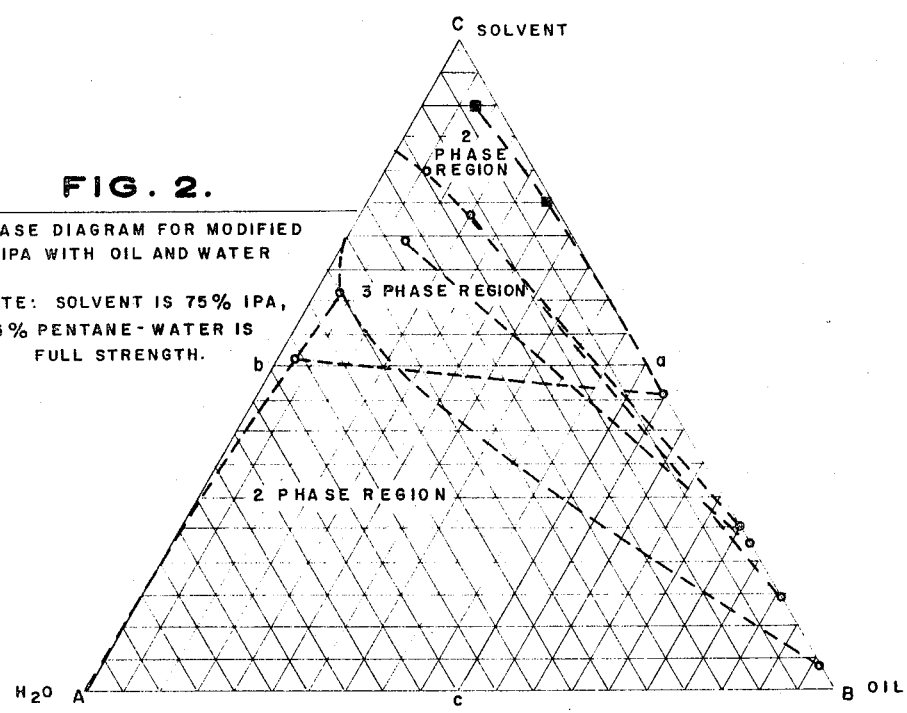
INVENTORS.
ROBERT J. BLACKWELL,
FRANK A. MORGAN, III.,
JOE K. HEILHECKER,
BY John D. Schneider
ATTORNEY.

PHASE DIAGRAM FOR MODIFIED IPA, OIL AND DILUTED BRINE

NOTE: SOLVENT IS 75% IPA, 25% PENTANE. WATER IS ONE-FOURTH-STRENGTH.

PHASE DIAGRAM FOR IPA-BENZENE MIXTURE, OIL AND DILUTED BRINE.

NOTE: SOLVENT IS 50% IPA, 50% BENZENE. WATER IS ONE-FOURTH-STRENGTH.

PHASE DIAGRAM OF IPA-TOLUENE MIXTURE, OIL AND BRINE.

NOTE: SOLVENT IS 50% IPA, 50% TOLUENE. WATER IS FULL-STRENGTH.

PHASE DIAGRAM FOR MODIFIED TBA, OIL AND WATER.

NOTE: SOLVENT 75% TBA, 25% PENTANE. WATER IS FULL-STRENGTH.

INVENTORS.
ROBERT J. BLACKWELL,
FRANK A. MORGAN, III,
BY JOE K. HEILHECKER

John S. Schneider
ATTORNEY

United States Patent Office 3,334,688
Patented Aug. 8, 1967

3,334,688
MISCIBLE DISPLACEMENT PROCESS USING MODIFIED ALCOHOL BANKS
Robert J. Blackwell and Frank A. Morgan III, Houston, and Joe K. Heilhecker, Bellaire, Tex., assignors, by mesne assignments, to Esso Production Research Company, Houston, Tex., a corporation of Delaware
Filed Apr. 13, 1964, Ser. No. 358,985
23 Claims. (Cl. 166—9)

The present invention relates generally to the recovery of oil from subsurface reservoirs. In particular, it concerns the recovery of reservoir oil by a displacement process which utilizes water-driven, modified alcohol banks as the displacing media. The invention is especially concerned with tertiary oil recovery; that is, the recovery of oil left in a reservoir already swept by water. However, the method of the invention is also useful in secondary oil recovery operations.

It is possible for fluids, which are miscible or which can become miscible with the reservoir oil, to displace all of the oil from the oil-containing portions of the reservoir contacted by such fluids. In practice, a bank or slug of these more costly oil-miscible solvents is first introduced into the reservoir after which cheaper scavenger fluids, which are miscible or which can become miscible with the oil-miscible solvents, are introduced into the reservoir.

Studies have shown that the displacing fluids should preferably have the following properties: (1) the viscosity of the displacing fluid should be equal to or greater than the viscosity of the displaced fluid in order to reduce channeling or viscous fingering of the displacing fluid and bypassing of the displaced fluid which is a result of such channeling; (2) in low permeability reservoirs and/or in reservoirs with low angles of inclination (dip angles), the displacing fluids should have densities as near as possible to the densities of the displaced fluids in order to reduce the effect of gravity segregation which promotes channeling of the displacing fluid along the top or bottom of the oil-bearing strata; and (3) the quantity of the more expensive components in the oil-miscible, solvent bank should be minimized, and a minimum, effective volume of the oil-miscible solvent between the displaced oil and the displacing scavenging fluid should be used.

The low viscosities and low densities of oil-miscible hydrocarbons used to displace reservoir oil compared to the viscosities and densities of reservoir oils result in channeling and viscous fingering of the displacing, miscible hydrocarbons through the reservoir oil. The poor vertical conformance and areal pattern efficiency resulting from the use of these hydrocarbon solvents give an inefficient sweep of the reservoir, although all oil is recovered from the region contacted when conditions of miscibility are met.

The sweep efficiencies for alcohol solvents such as isopropyl alcohol (IPA) or tertiary butyl alcohol (TBA), which are or can become miscible with reservoir oils as well as with reservoir resident waters, are much higher than those for the aforementioned hydrocarbon solvents because the viscosities of the alcohols are closer to and generally greater than the viscosities of most crude oils and resident waters; and, the density difference of the alcohol solvent-crude oil system is less than that for the hydrocarbon solvent-crude oil system. Consequently, viscous fingering is less severe or even absent and gravity segregation is much less a problem in the alcohol flood system than in other systems. However, a disadvantage in the use of alcohol is that the equilibrium relations between most alcohols, crude oil, and resident waters are such that the small concentrations of water in the alcohol, and particularly water containing small quantities of salts; e.g. NaCl, MgCl, etc., can prevent or inhibit the attainment of miscibility. In addition, the high cost of alcohols which are or can become miscible with the oil prohibits their use in many reservoirs where their use would be technically feasible.

The present invention uniquely combines the hydrocarbon and alcohol solvent systems in a manner that retains the advantages but overcomes the disadvantages of each. Preferably, three solvent banks driven by water are introduced into the reservoir. The first and third banks comprise alcohol miscible with the reservoir oil, and the resident water and the middle bank consists essentially of an oil-miscible hydrocarbon solvent and the same alcohol.

A water-soluble gas such as carbon dioxide may be added to the alcohol in the first and third banks to adjust the viscosities and densities of these banks and to improve solubility of the alcohol in the oil and water. In addition, less alcohol is needed when a diluting gas is employed. Also, where the alcohol in the middle bank is soluble to only a limited extent in the reservoir oil, a hydrocarbon liquid such as benzene or toluene may be added to the alcohol to make the alcohol preferentially soluble in the reservoir oil.

The oil-miscible hydrocarbon solvent is defined for purposes herein as a low molecular weight, paraffinic hydrocarbon such as ethane, propane, butane, pentane, or mixtures thereof. A good solvent is liquified petroleum gas, known as LPG, which is mainly propane and butane and may include methane, ethane, pentane, and heavier hydrocarbons. Other good solvents include aromatic hydrocarbons such as naphtha, xylene, toluene, benzene and refinery by-products rich in aromatics.

Ketones and esters containing three or four carbon atoms such as methylethylketone, methylpropylketone, diethylketone, methylacetate, propylformate may be used as the hydrocarbon solvent. Alcohols substantially soluble in both oil and water such as isopropyl alcohol, n-propyl alcohol, tertiary butyl alcohol, secondary butyl alcohol, n-butyl alcohol, and amyl alcohol or mixtures thereof may be used as the alcohol phase. Ammonia or sulfur dioxide may be used instead of carbon dioxide.

To increase the miscibility between the alcohol and the resident water it contacts, the resident water may be diluted with water having less salt content than the resident water. The upper dilution limit is that which avoids clay dispersion or swelling.

The primary purpose of the first alcohol bank is to displace the resident water so that the middle bank can be effective in displacing the reservoir oil. The main purpose of the middle bank, then, is to displace miscibly the reservoir oil. The primary purpose of the third bank is to isolate the middle bank from the driving water which follows the third bank.

As an example of the bank compositions, the first bank which is miscible with the reservoir oil and the resident water may have a viscosity of about 1 cp. and a density of about 0.816 gram/cc. and contains a mixture of about 15% by volume $CO_2$ and about 85% IPA; the second bank which is miscible with both the preceding first bank and the following third bank may have a viscosity of about 1 cp. and a density of about 0.720 gram/cc. and contain about 25% by volume propane and about 75% by volume IPA; and the third bank which is miscible with the second bank and with the following flood water is of the same composition as the first bank.

A primary object of the present invention, therefore, is to provide an improved oil recovery process using water-driven, modified alcohol banks to displace reservoir oil in secondary or tertiary oil recovery processes.

The above object and other objects and advantages of the invention will be apparent from a more detailed description thereof when taken with the drawings wherein:

FIG. 1 is a schematic representation of a cross section of the earth's subsurface illustrating the process of the invention;

FIGS. 2–6 are ternary phase diagrams of various brine-oil-alcohol systems;

Figure 3:
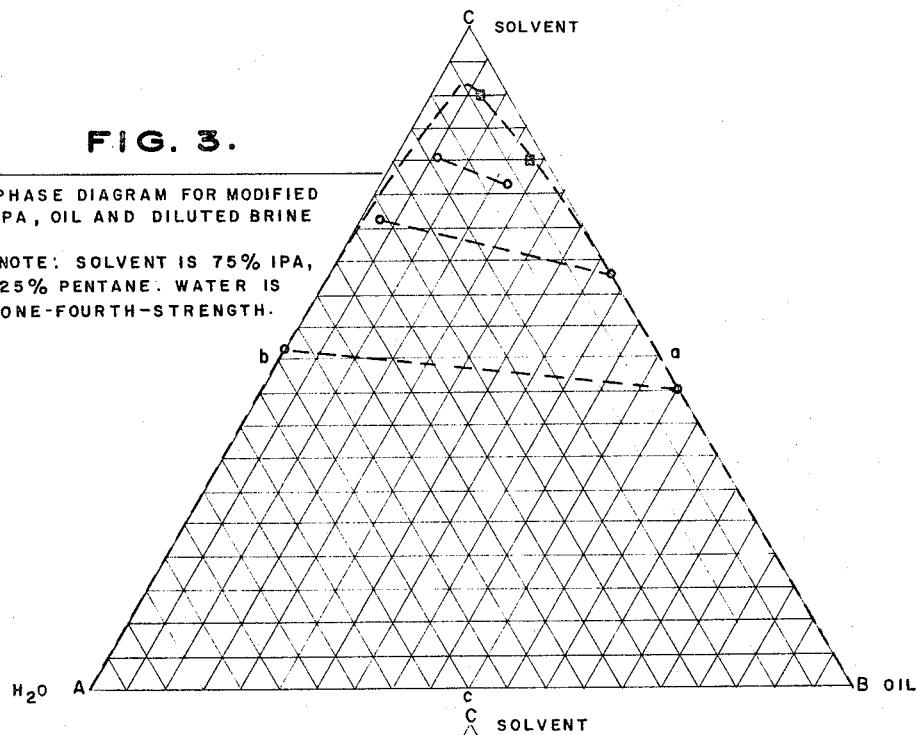

The operation of the invention, as illustrated in FIG. 1, comprises introducing into a watered-out reservoir 10 through an input well 11 a first bank 12 of alcohol solvent and $CO_2$ followed by a middle bank 13 of hydrocarbon solvent and alcohol solvent followed by a third bank 14 of alcohol solvent and $CO_2$ similar in composition to lead bank 12. The third bank 14 is followed by a displacing, scavenging water drive designated 15 which moves the modified alcohol banks 12, 13, and 14 through the reservoir to the output well 16 through which the reservoir oil displaced by the modified alcohol banks is produced.

As mentioned above, this process is especially designed to recover oil from reservoirs that have been previously waterflooded. Thus, reservoir 10, just prior to the introduction of the modified alcohol solvent banks, preferably has a high water saturation on the order of, for example, 65 to 75% by volume water.

The following experiments were carried out to illustrate the operation of the invention, and they show the miscibility relationships for particular oils, waters, and modified alcohol solvents.

To 100 cc. centrifuge tubes were added various amounts of oil and water in the ratio of 3 parts oil to 7 parts water (about the ratio left in the cores after waterflooding). Then, a solvent mixture was added to give a total volume of 100 cc. These fluids were mixed intimately by vigorously shaking the centrifuge tubes. The tubes were then centrifuged to separate the mixture if more than one phase was present. The volumes of the various phases were then read and recorded. Samples of the separate phases were analyzed using a chromatograph and using Karl Fischer apparatus for water content. The compositions and volumes were then used to construct the ternary phase diagrams of FIGS. 2 to 6.

In these phase diagrams even though two or three solvents were used in each case, the solvent was arbitrarily treated as a single component. Also, in some instances, more than two phases co-existed in equilibrium; and where there existed an oleic phase, an amber solvent-rich phase and a clean, aqueous phase, the amber and aqueous phases were arbitrarily represented as a single phase on the binodal curve.

The foundation solvents studied in these experiments, isopropyl alcohol and tertiary butyl alcohol, were chosen for their good solubility in both water and oil, their availability, and their reasonably low cost. The other solvents added to isopropyl alcohol or tertiary butyl alcohol were pentane (simulating propane), benzene, and toluene. In one series of measurements, TBA, IPA and pentane mixtures were used. In most of the experiments, the water phase was water having a salt concentration sufficiently low so that the water was soluble in all proportions with either IPA or TBA.

As seen in FIGS. 2 and 3, the first series of experiments measured were those involving a solvent composed of 75% by volume IPA and 25% by volume pentane. The water of FIG. 2 was four times the strength of the water of FIG. 3. With the most highly concentrated salt water, the solvent was preferentially soluble in the aqueous phase. Also, it was known that three phases existed over a large region of composition; however, the three-phase region shrunk and disappeared, as seen in FIG. 3, when the water was diluted to about one quarter its original salt content. The tie lines became more horizontal as the water was diluted to one quarter strength, and the plait point moved toward the apex. The lack of a three-phase region and the location of the plait point near the apex show that when the formation water contains too high a salt concentration, the reservoir sand should be preflooded with a small bank of diluted water to achieve the greatest advantages in oil recovery with the modified alcohol bank solvents. The minimum salt content of the dilution water is that which avoids clay dispersion or swelling.

Figure 4:
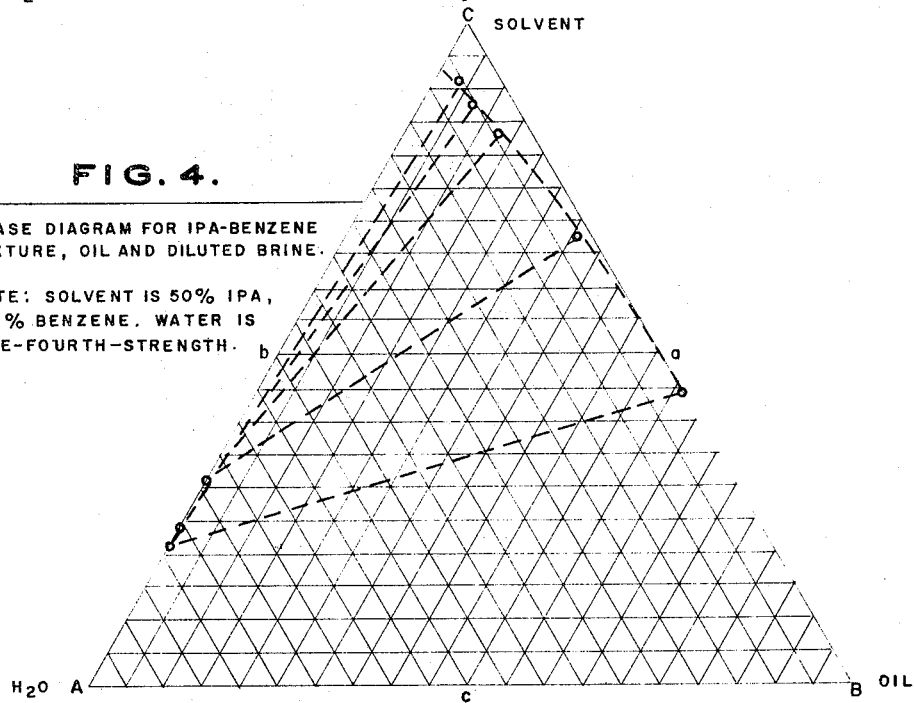
Figure 5:
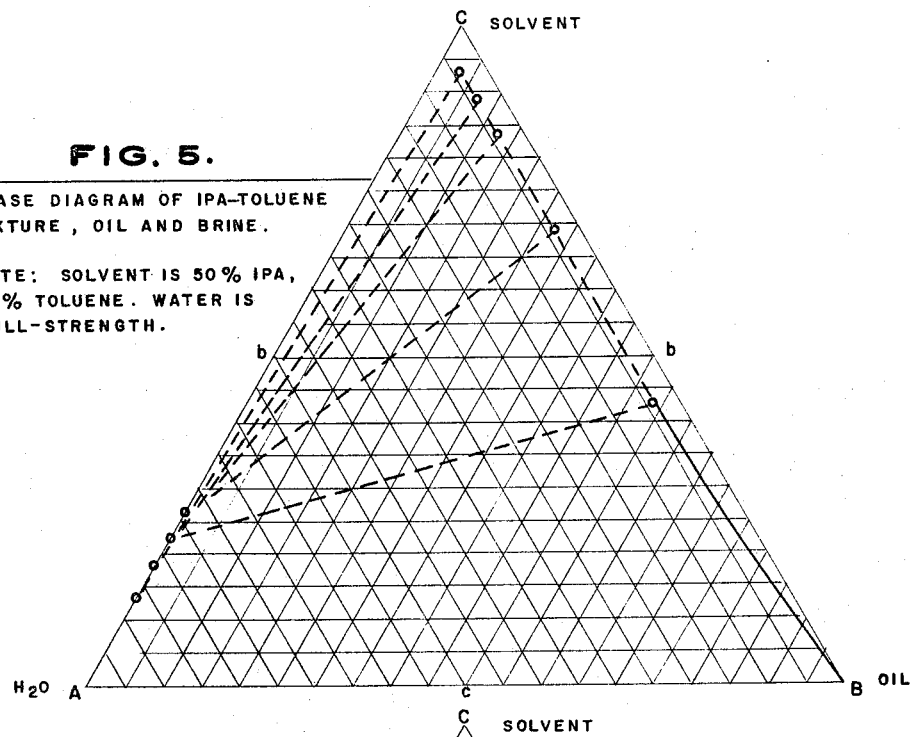

The next series of measurements, as seen in FIGS. 4 and 5, involved a 50–50 mixture of IPA and benzene or toluene. These solvent mixtures were highly preferentially soluble in the crude oil compared to their solubility in salt water. Note the tolerance of this system for about 5% water at high alcohol concentrations before the two phases appear.

Figure 6:
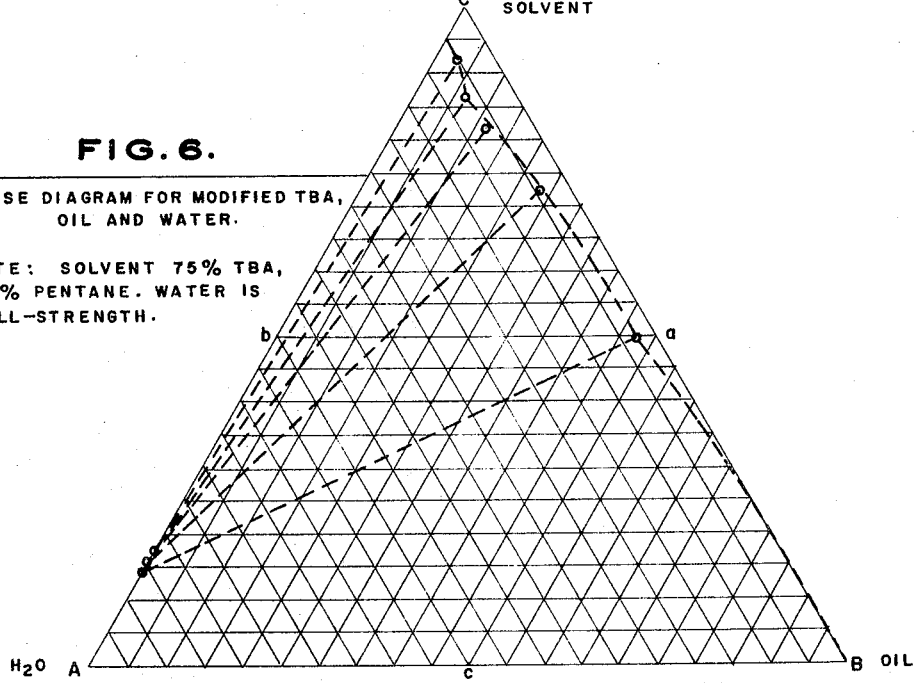

The series of measurements shown in FIG. 6 employed as the solvent 75% by volume TBA and 25% by volume pentane. The data represented in FIG. 6 are for the full strength water, such as was represented in FIGS. 2 and 5. These solvents are highly preferentially soluble in oil compared with their solubility in water. Note in FIG. 6 that the equilibrium TBA concentration in the brine is about 15% oil.

FIGS. 2 to 6 show that dilution of the formation water enhances miscibility of the water with the flooding alcohol where the formation or resident water has too high a salt content. Consequently, in such instances, it is desirable to precede the initial alcohol bank with water having a lesser salt concentration than the resident water in order to dilute the resident water and cause it and the alcohol bank to become completely miscible. The three-phase diagrams also show that the addition of other solvents, such as benzene and toluene, to the oil-miscible phase increases its miscibility with certain crude oils.

A series of displacement experiments were conducted in sandstone cores to illustrate the invention. In each experiment the core was initially saturated with brine, flooded to connate water with crude oil, and then water-flooded to a residual oil saturation. Two representative experiments were carried out in a three-foot berea sandstone core with the modified alcohol banks in each case having the following compositions. The first and third banks contained 85% IPA and 15% $CO_2$ and the middle bank contained 75% IPA and 25% propane. The bank size in the first experiment was 135% pore volume, and the oil recovery percent residual was 23.6% "clean" oil. By "clean" oil is meant the oil uncontaminated with alcohol. In the second experiment the bank size was 50% pore volume of the solvent, and the water was one quarter strength of the water in the first experiment and the second experiment achieved an oil recovery percent residual of "clean" oil of 57% and a total oil recovery of 65.8%.

The much greater recovery obtained when using smaller alcohol banks preceded by diluted water emphasizes the importance of the use of an initial bank which is completely miscible with the reservoir water and which can displace it ahead so that the middle or "oil recovery" bank can be effective. A trailing bank completely miscible with the driving water is equally important in isolating the oil recovery bank from water which would lower its efficiency.

Figure 7:
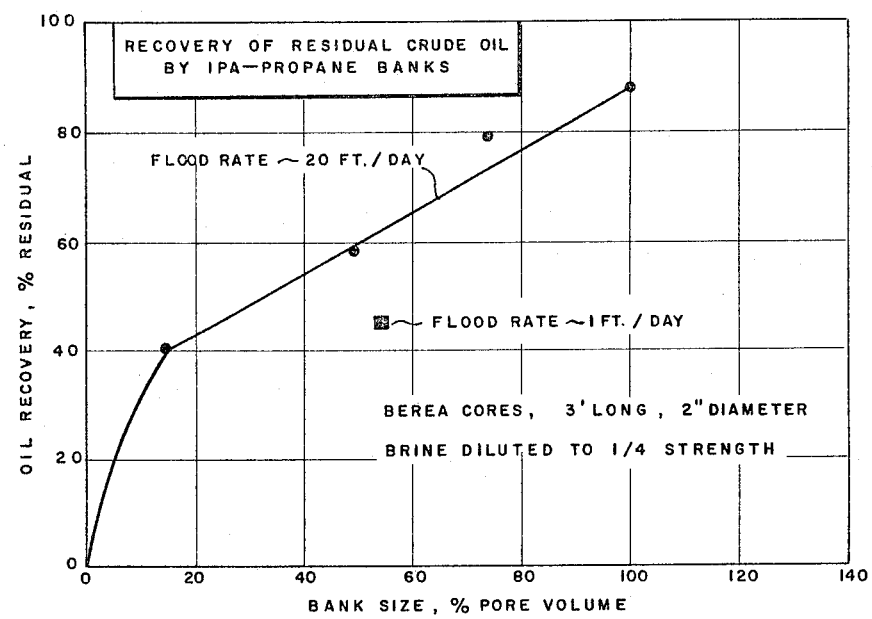
FIGS. 7–9 are oil recovery plots illustrating experimental data obtained in accordance with the three-bank process of the invention.
Figure 8:
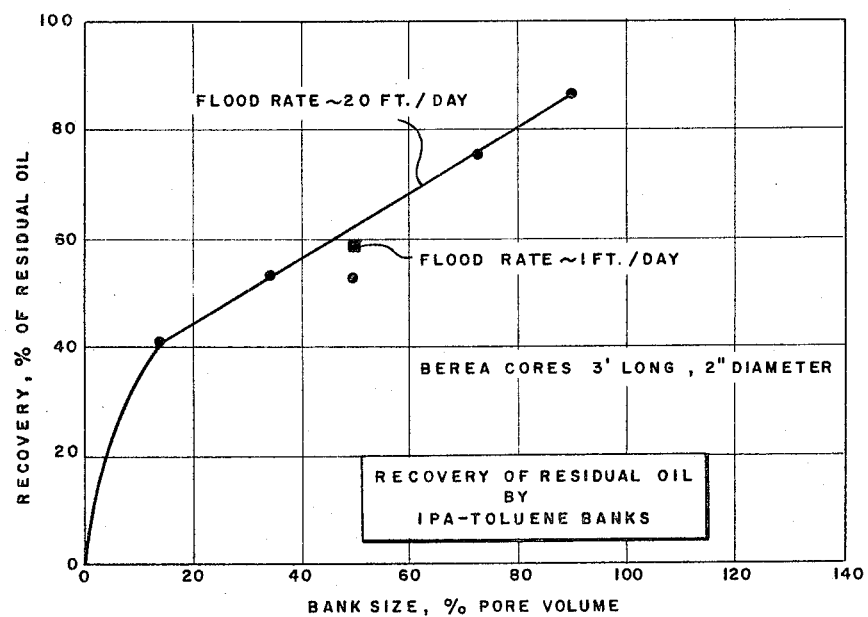
Figure 9:
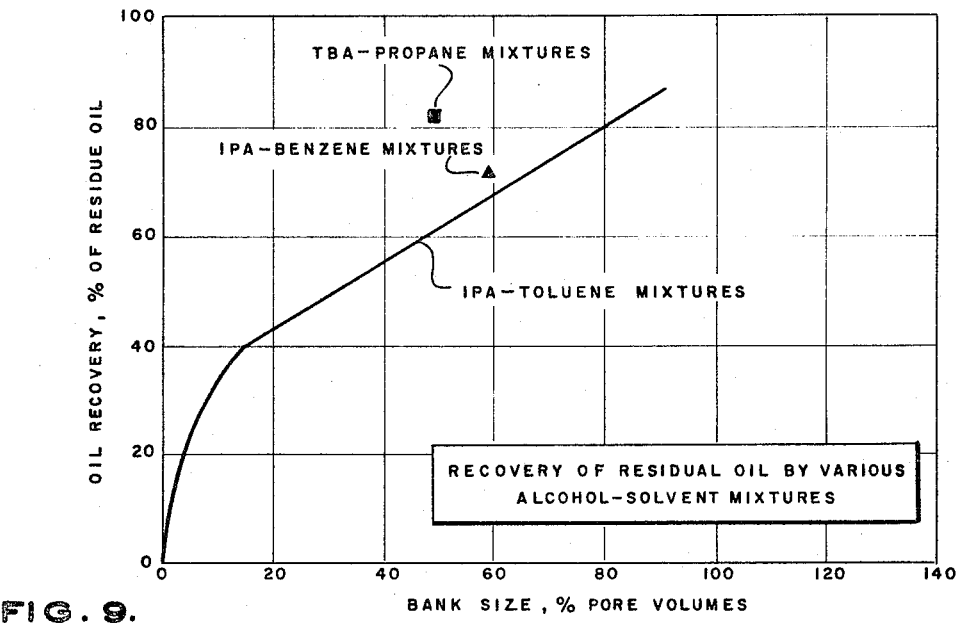

Many additional experiments have been carried out in a similar manner, and data illustrating the results of these experiments are illustrated in FIGS. 7 to 9.

The data in FIG. 7 are for displacement of a particular crude oil left by waterflooding in a 3-foot long, 2-inch diameter berea sandstone with the procedure described above. The data represented by solid points were obtained at flooding rates of 20 feet/day. The curve through these data illustrates that as the solvent bank size increased, additional recovery was obtained. The important point to note on this figure is that the recovery obtained when flooding at 1 foot/day was less than would have been obtained by a similar bank size when flooding at 20 feet/day. However, when toluene was used instead of propane in the middle bank and preceded and followed by IPA–$CO_2$ banks in displacing this same oil, good recoveries were obtained at both 1 foot/day and 20 feet/day as shown in FIG. 8.

The data in FIGS. 7 and 8 suggest that with certain crude oils, complete miscibility of the oil with IPA-propane banks is not attained. In these cases more powerful but slightly more expensive solvents such as toluene must be used to obtain good recoveries. However, with many other crude oils, propane-IPA mixtures can be effective in recovery of a large fraction of the oil. The data in FIG. 8 illustrate that when the correct solvent combinations are used, very high recoveries (>90%) of the oil left by water can be expected from the parts of the reservoir swept by the solvent banks.

Additional data are presented in FIG. 9 to illustrate several other solvent combinations effective in oil recovery. The solid curve is that of FIG. 8 for various bank sizes of the IPA-toluene system displacing a particular crude oil. The triangular point at a recovery of 71% of the residual oil was obtained using the three-bank system IPA-$CO_2$, IPA-benzene, IPA-$CO_2$ with a total bank size of 59% pore volume. Also shown by the square point is 82% recovery for the three-bank system TBA-$CO_2$, TBA-propane, TBA-$CO_2$ with a total bank size of 50% pore volume. Although each of these solvent systems displaced more oil than that shown on the curve for similar bank sizes of the IPA-toluene system, the particular solvent system selected in practical situations depends on availability of the materials and whether the value or additional recovery is greater than the additional cost of more effective solvents.

In some instances, as when the reservoir oil is particularly viscous, the lead alcohol bank may be omitted. A representative experiment conducted in the sandstone core used banks having the following compositions. The first bank contained 59% IPA and 41% toluene and the second bank contained 85% IPA and 15% $CO_2$. The first bank was 60% of the total volume of the two banks which total volume constituted 57½% pore volume. The oil recovery percent residual was 72.8% "clean" oil and 78.4% total oil. The percent toluene recovered was 79.8%.

Figure 10:
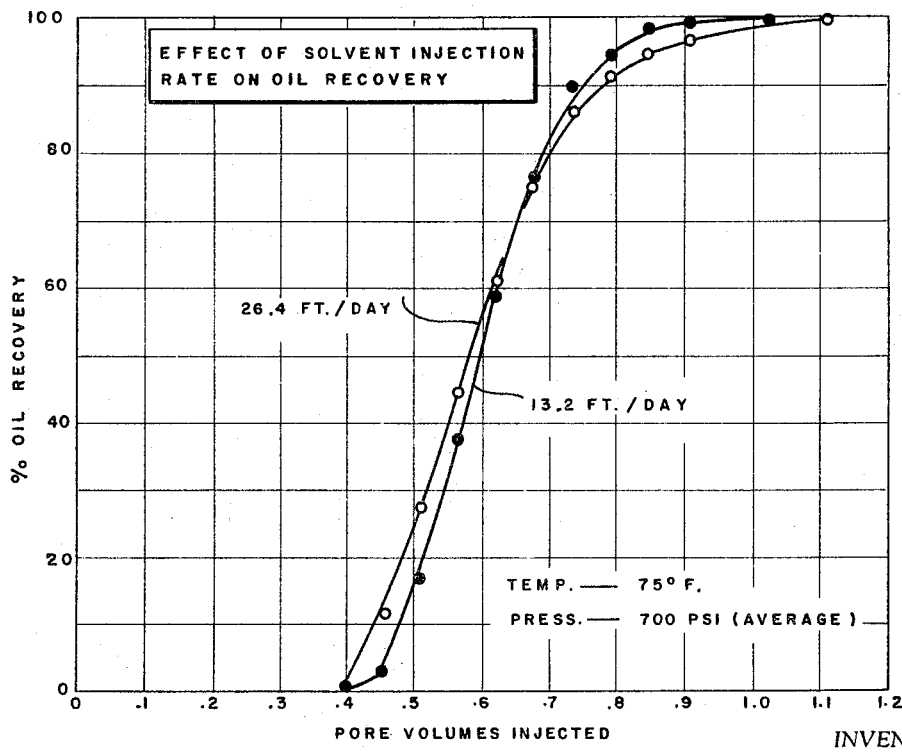
FIG. 10 shows oil recovery data for experiments using a single, mixed alcohol solvent-hydrocarbon solvent bank in a sand column.
Figure 11:
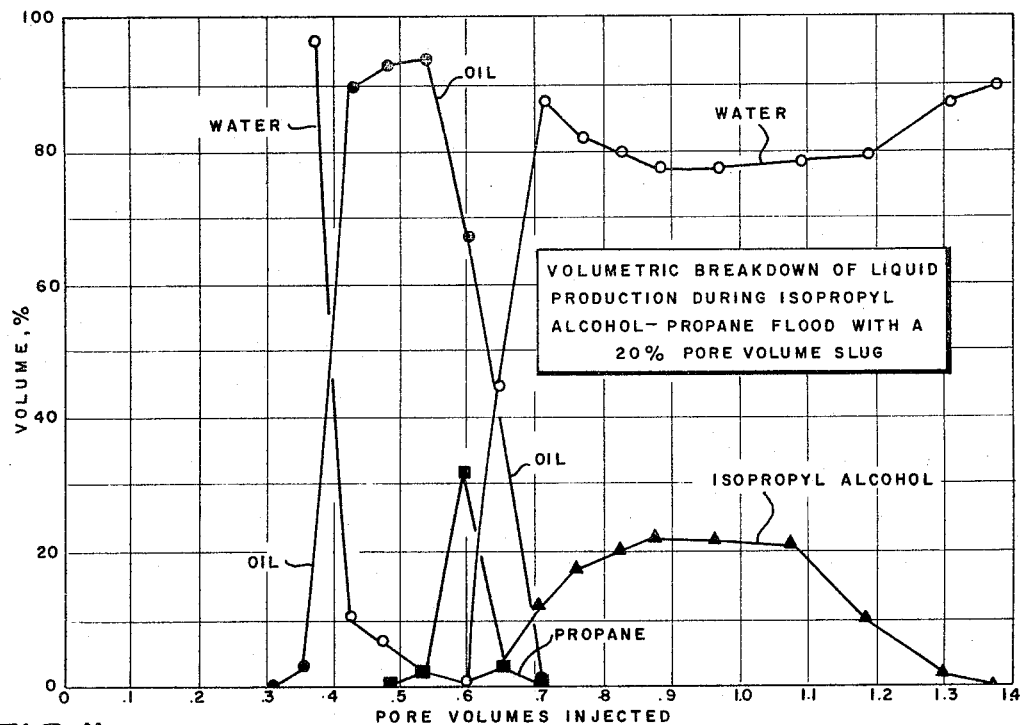
FIG. 11 shows the production history for the experiments similar to those of FIG. 10.

Another group of experiments using single and triple banks were conducted in a 10-foot section of ⅜-inch O.D. steel tubing packed with #16 sand. The sand was saturated with brine water at 700 p.s.i. and 75° F. Crude oil was injected into the sand pack until water production ceased and then the sand was waterflooded to residual oil saturation. In one series the solvent, a 50–50 volume percent mixture of isopropyl alcohol and propane, was injected into the column at rates of 13.2 feet per day, and 26.4 feet per day. In FIG. 10 the percent residual oil recovery vs. pore volumes of solvent injected for these two injection rates are shown. As seen, the recovery curves for the two experiments are similar and complete oil recovery was obtained after approximately 1.1 pore volumes of solvent were injected. In another experiment a 20% pore volume bank of the same solvent was injected at a rate of 26.4 feet per day into the column and driven by water and FIG. 11 gives the volumetric distribution of the produced materials. Although, as seen in this figure, the solvent slug lost miscibility with the oil before the entire column length was traversed, an oil bank of appreciable size built up as 75% of the residual oil was produced. It is to be noted from FIG. 11 that there was separation of the propane from the alcohol as the solvent moved through the column. This apparently was caused by residual water extracting alcohol from the solvent. Also, water trapped propane in the column as only 21.6% of the injected propane was recovered. Such action as has been shown can be prevented by preceding the IPA-propane bank with an alcohol bank to miscibly displace the residual water and by following such bank with a trailing alcohol bank to prevent entrapment.

Figure 12:
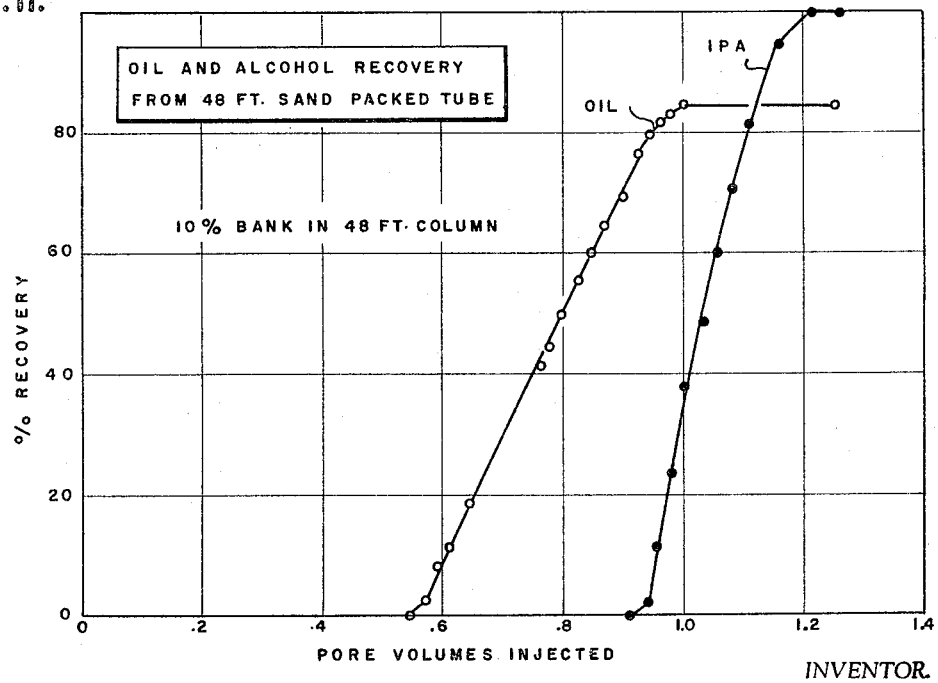
FIG. 12 illustrates oil and alcohol recovery data for experiments using three solvent banks in a sand column.

Another series of experiments were carried out to illustrate the advantages of the three-bank solvent injection technique in the sand-packed column. The sand-packed tubes varied in length as 10 feet, 24 feet, 48 feet, and 100 feet. After the waterflooding, the tubes were left with an average residual oil of about 30%. The mixtures were injected as follows. First, a leading solvent bank which contained 15% by volume carbon dioxide dissolved in isopropyl alcohol was used to displace all of the resident water and some of the crude oil from the sand. The presence of the carbon dioxide gave the alcohol bank a viscosity of about 1 cp. (about the same as the viscosity of the water). Then a middle solvent bank composed of 25% by volume propane and 75% isopropyl alcohol was used to complete oil recovery. The presence of the propane in this bank reduced the viscosity of the alcohol to about 1 cp. and increased the displacement efficiency of the alcohol. A final solvent bank of the same composition as the lead bank was used to prevent the driving water from contacting and entrapping the propane in the middle solvent bank. As seen by the oil and isopropyl curves of FIG. 12, about 90% of the oil left by the water after waterflooding can be displaced by the alcohol banks and 100% of the isopropyl alcohol is recoverable.

Having fully described the nature, operation, advantages and objects of our invention, we claim:

1. A method of recovering oil from a subsurface oil reservoir comprising the steps of:
   introducing into said reservoir through an input well a first bank of alcohol solvent miscible with reservoir resident water;
   introducing into said reservoir behind said first bank of alcohol solvent a second bank of mixed solvents consisting essentially of a hydrocarbon solvent miscible with said reservoir oil and an alcohol solvent miscible with said hydrocarbon solvent and said reservoir oil;
   introducing into said reservoir behind said second bank of solvent a third bank of alcohol solvent miscible with said hydrocarbon and alcohol solvent of said second bank;
   introducing into said reservoir behind said third bank of solvent a flood water miscible with said alcohol solvent of said third bank, said flood water displacing said alcohol banks and said alcohol banks displacing said reservoir oil to a producing well spaced from said input well; and
   then producing reservoir oil through said producing well.

2. A method as recited in claim 1 in which a water-soluble gas is mixed with the alcohol solvents of said first and third banks.

3. A method as recited in claim 2 in which said alcohol banks have a viscosity close to the viscosities of said resident water and said reservoir oil.

4. A method as recited in claim 3 in which said alcohol solvent is a compound selected from the group consisting of propyl alcohols, butyl alcohols, and amyl alcohol; and said water-soluble gas is a compound selected from the group consisting of carbon dioxide, ammonia, and sulfur dioxide.

5. A method as recited in claim 4 in which said hydrocarbon solvent is a compound selected from the group consisting of ethane, propane, butane, pentane, LPG, naphtha, xylene, toluene, benzene, ketones, esters, and aromatic-rich refinery by-products.

6. A method as recited in claim 5 in which said water-soluble gas consists essentially of carbon dioxide in the amount of about 15% by volume of the volume of each of said first and third banks.

7. A method as recited in claim 6 in which a bank of water containing a lesser salt concentration than said resident water is introduced into said reservoir through said input well ahead of said solvent banks to dilute said resident water.

8. A method as recited in claim 7 in which said first bank is about 30% by volume of the total volume of said three banks and said second bank is about 40% by volume of the total volume of said three banks.

9. A method of recovering oil from a subsurface oil reservoir comprising the steps of:
introducing into said reservoir through an input well spaced from a producing well a first bank of mixed solvents consisting essentially of a hydrocarbon solvent miscible with said reservoir oil and an alcohol solvent miscible with said hydrocarbon solvent and reservoir resident water;
introducing into said reservoir behind said first bank of solvent a second bank of alcohol solvent selected from the group consisting essentially of propyl alcohols, butyl alcohols, amyl alcohol and mixtures thereof, miscible with said first bank of solvent and following flood water and containing a water-soluble gas in preselected amounts to adjust viscosity and density and to improve solubility of said alcohol solvent in said reservoir oil and resident water;
introducing flood water behind said second bank of alcohol solvent to displace said mixed solvent bank, which in turn displaces said reservoir oil to said producing well; and
then producing reservoir oil through said producing well.

10. A method as recited in claim 9 in which said alcohol solvent in said first bank is a compound selected from the group consisting of propyl alcohols, butyl alcohols, amyl alcohol and mixtures thereof; and said water-soluble gas is a compound selected from the group consisting of carbon dioxide, ammonia, and sulfur dioxide.

11. A method as recited in claim 10 in which said hydrocarbon solvent is a compound selected from the group consisting of ethane, propane, butane, pentane, LPG, naphtha, xylene, toluene, benzene, ketones, esters, and armomatic-rich refinery by-products.

12. A method as recited in claim 11 in which said water-soluble gas consists essentially of carbon dioxide in the amount of about 15% by volume of said second bank.

13. A method as recited in claim 12 in which a bank of water containing a lesser salt concentration than said resident water is introduced into said reservoir through said input well ahead of said solvent banks to dilute said resident water.

14. A method of recovering oil from a subsurface oil reservoir comprising the steps of:
introducing into said reservoir through an input well an initial bank of alcohol solvent miscible with reservoir resident waters;
introducing into said reservoir behind said initial bank of alcohol solvent a middle bank of mixed solvents consisting essentially of a hydrocarbon solvent miscible with said reservoir oil and an alcohol solvent miscible with said hydrocarbon solvent and said reservoir oil;
introducing into said reservoir behind said middle bank of solvent a trailing bank of alcohol solvent miscible with said hydrocarbon and alcohol solvent of said middle bank; and
producing reservoir oil through said producing well.

15. A method as recited in claim 14 in which a water-soluble gas is mixed with said alcohol solvents of said initial and trailing banks.

16. A method as recited in claim 15 in which said alcohol banks have a viscosity close to the viscosities of said resident water and said reservoir oil.

17. A method as recited in claim 16 in which said alcohol solvent is a compound selected from the group consisting of propyl alcohols, butyl alcohols, amyl alcohol and mixtures thereof; and said water-soluble gas is a compound selected from the group consisting of carbon dioxide, ammonia and sulfur dioxide.

18. A method as recited in claim 17 in which said hydrocarbon solvent is a compound selected from the group consisting of ethane, propane, butane, pentane, LPG, naphtha, xylene, toluene, benzene, ketones, esters, aromatic-rich refinery by-products and mixtures thereof.

19. A method as recited in claim 18 in which said water-soluble gas consists essentially of carbon dioxide in the amount of about 15% by volume of the volume of said initial bank and about 15% by volume of the volume of said trailing bank.

20. A method as recited in claim 19 in which a bank of water containing a lesser salt concentration than said resident water is introduced into said reservoir through said input well ahead of said solvent banks to dilute said resident water.

21. A method as recited in claim 20 in which said initial bank is about 30% by volume of the total volume of said three banks and said middle bank is about 40% by volume of the total volume of said three banks.

22. A method of recovering oil from a subsurface oil reservoir comprising the steps of:
introducing into said reservoir through an input well a first bank of alcohol solvent miscible with reservoir resident water;
introducing into said reservoir behind said first bank of alcohol solvent a second bank of mixed solvents consisting essentially of a hydrocarbon solvent miscible with said reservoir oil and an alcohol solvent miscible with said hydrocarbon solvent and said reservoir oil; and
producing resorvoir oil through said producing well.

23. A method as recited in claim 22 in which said first bank of alcohol solvent consists essentially of isopropyl alcohol and said hydrocarbon solvent is a compound selected from the group consisting of toluene, benzene and mixtures thereof.

References Cited

UNITED STATES PATENTS

| 3,033,288 | 5/1962 | Holm | 166—9 |
| 3,121,460 | 2/1964 | Braunwarth et al. | 166—9 |
| 3,126,952 | 3/1964 | Jones | 166—9 |
| 3,137,345 | 6/1964 | Harvey et al. | 166—9 |
| 3,181,609 | 5/1965 | Csaszar et al. | 166—9 |
| 3,267,999 | 8/1966 | Reed et al. | 166—9 |

OTHER REFERENCES

Slobod, "Research on Methods for Improving Oil Recovery from Pennsylvania Oil Fields," Producers Monthly, January 1960, pages 16–18, 20, 21, 24–27.

Slobod et al., "Modification of the Alcohol Slug Process for Application to the Bradford Reservoir," Producers Monthly, January 1962, pp. 2 to 6 relied on.

ERNEST R. PURSER, *Primary Examiner.*

JACOB L. NACKENOFF, STEPHEN J. NOVOSAD, *Examiners.*